United States Patent [19]

Nagai et al.

[11] 3,871,343

[45] Mar. 18, 1975

[54] RECYCLE ENGINE APPARATUS

[75] Inventors: Masashi Nagai; Kazuhito Miwa; Masakazu Tsunetsugu; Tadamaro Fujiwara, all of Osaka, Japan

[73] Assignee: Hitachi Shipbuilding and Engineering Company, Ltd., Osaka, Japan

[22] Filed: July 17, 1974

[21] Appl. No.: 489,094

Related U.S. Application Data

[63] Continuation-in-part of Ser. No. 347,885, April 4, 1973.

[30] Foreign Application Priority Data

| Apr. 14, 1972 | Japan | 47-37592 |
| Apr. 14, 1972 | Japan | 47-37593 |
| Aug. 21, 1972 | Japan | 47-83502 |
| Aug. 21, 1972 | Japan | 47-83503 |
| Aug. 21, 1972 | Japan | 47-83505 |

[52] U.S. Cl. ............... 123/119 A, 60/278, 114/16, 123/25 R, 123/25 E, 123/41.01
[51] Int. Cl. .......................................... F02m 25/06
[58] Field of Search ............ 123/119 A, 25 E, 25 F, 123/25 A, 25 Q, 25 R, 41.01; 114/16; 60/278

[56] References Cited
UNITED STATES PATENTS

| 1,750,919 | 3/1930 | Becker | 123/119 A |
| 2,187,074 | 1/1940 | Caproni | 114/16 |
| 2,720,856 | 10/1955 | Hoke, Jr. | 123/119 A |
| 2,884,912 | 5/1959 | Lewis | 123/119 A |
| 3,559,402 | 2/1971 | Stone et al. | 123/119 A |
| 3,709,203 | 1/1973 | Cettin et al. | 123/119 A |
| 3,774,391 | 11/1973 | Puttick | 123/119 A X |
| 3,786,635 | 1/1974 | Kates et al. | 123/119 A |
| 3,792,690 | 2/1974 | Cooper | 123/119 A |
| 3,807,373 | 4/1974 | Chen | 123/119 A |

Primary Examiner—Wendell E. Burns
Attorney, Agent, or Firm—Farley, Forster and Farley

[57] ABSTRACT

Apparatus for operating an engine by recycling exhaust gas to the engine intake and including a recycling system provided with means for discharging excess exhaust gas and controlling the working pressure in the system, for automatically controlling the volume of oxygen introduced into the recycling system to form a combustion gas, and for automatically controlling the oxygen supplied to the system in proportion to the fuel supplied to the engine. Other features provide for purging of the system prior to engine start and for the removal from the system of water resulting from combustion. Optional non-recycling or normal operation is provided for together with recycling operation of the engine under submerged conditions.

17 Claims, 7 Drawing Figures

RECYCLE ENGINE APPARATUS

This application is a continuation-in-part of application Ser. No. 347,885, filed Apr. 4, 1973.

SUMMARY OF THE INVENTION

According to the invention, apparatus for operating an engine having a gas intake, an exhaust gas outlet and a working gas recycling system connected between the intake and the outlet, comprises means for controlling the volume of exhaust gas recycled to the engine intake in said recycling system including a compressor having an inlet connected to the recycling system and an outlet, the compressor being capable of compressing exhaust gas at a rate in excess of the full load exhaust volume less the full load intake volume of the engine, a return connection from the compressor outlet to the recycling system, and means including a control valve in the return connection for returning a portion of the compressed exhaust gas to the recycling system to maintain the working gas pressure at a constant value and for discharging the remainder of the compressed exhaust gas from the apparatus. An oxygen supply means communicating with the recycling system includes an oxygen supply flow control valve, an oxygen concentration detector, an oxygen concentration presetter, and an oxygen volume control means for producing an output signal to regulate the oxygen supply flow control valve in response to output signals from the oxygen concentration detector and presetter.

Preferably, the oxygen volume control means is capable of regulating the flow of oxygen to the recycling system in accordance with the theoretical oxygen volume necessary for complete combustion of the fuel supplied to the engine as indicated by the output of a fuel supply volume detector having an output connected to the oxygen volume control means so that this control means compares the fuel supplied, the preset oxygen concentration indicated by the presetter, and the detected oxygen concentration indicated by the concentration detector to arrive at the output signal for regulating the oxygen supply control valve. The fuel supply volume may be detected either as a combination of engine rpm and fuel pump setting, or by a flow meter communicating with the engine fuel supply system.

Another preferred feature of the invention is to provide in the recycling system a heat exchanger adapted to reclaim heat from the engine exhaust gas for heating the engine intake gas, the heat exchanger including a reservoir which serves as a surge control for the intake gas.

During a low load engine operation, the recycling system includes an exhaust bypass valve communicating between the engine exhaust outlet and intake so that exhaust gas can be mixed directly with the intake gas.

For starting the engine, the apparatus includes means for blowing compressed gas into the recycling system, this means being provided with a shut-off valve and a restricted bypass so that the flow of compressed gas can be reduced once the engine starts and be maintained at a lesser value during engine warm-up.

The apparatus also provides for returning leakage gas, from the engine crankcase for example, to the recycling system, and also for drawing ambient gas into the recycling system from a room in which the engine may be located.

Other features and advantages of the invention will appear from the description to follow of the embodiments thereof illustrated in the accompanying drawings.

DESCRIPTION OF THE PREFERRED EMBODIMENTS

Figure 1:
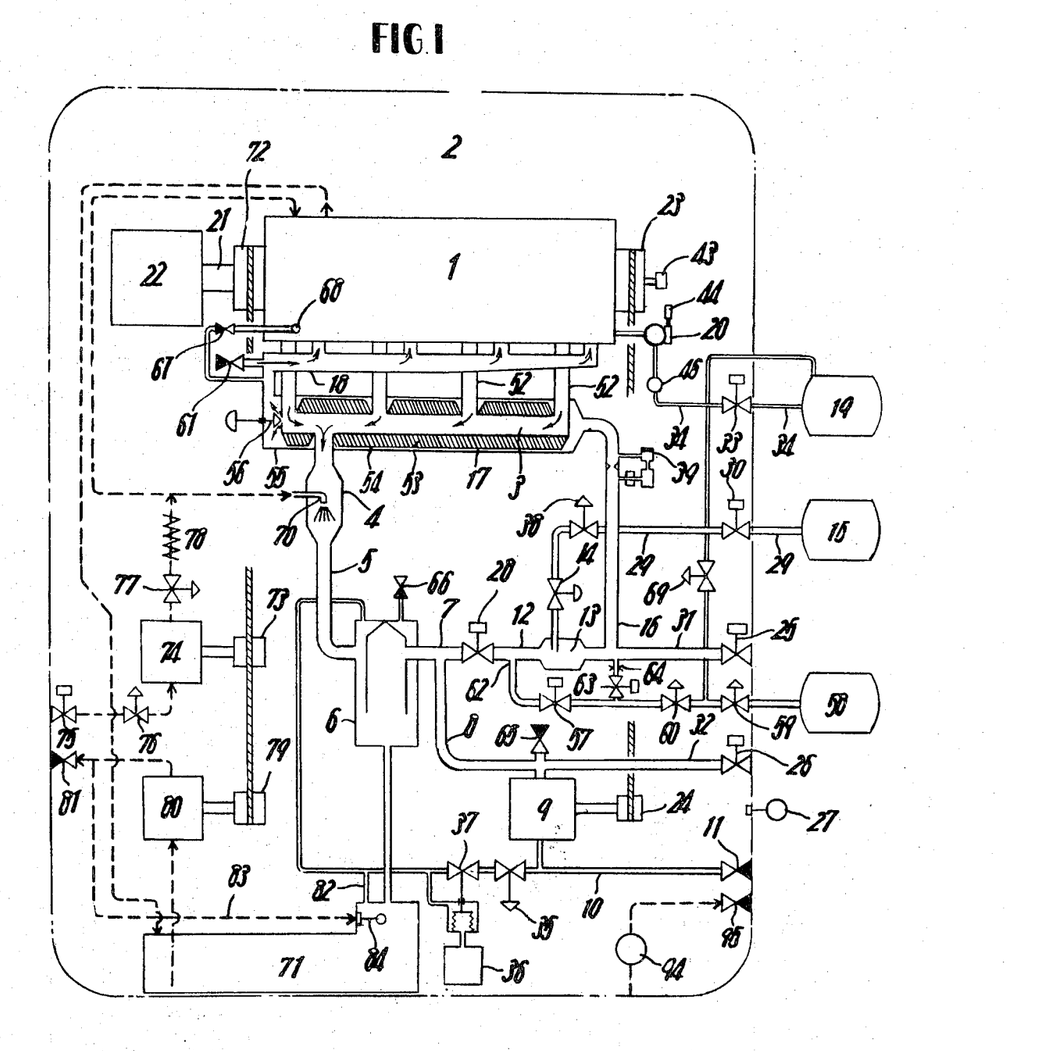
FIG. 1 is a diagrammatic view of the entire construction.

In FIG. 1, an engine 1 is installed in an engine room 2. The exhaust gas from said engine 1 is passed through an exhaust collection pipe 3 into an exhaust cooler 4, where it is cooled to normal temperature. While the combustion produced water vapor contained in the exhaust gas is being condensed, the exhaust gas is passed through an exhaust pipe 5 into a gas water separator 6, where said condensed combustion produced water is separated. An amount of the dewatered exhaust gas corresponding to the carbon dioxide gas produced by combustion is passed as excessive gas through a recycle gas conduit 7 and a compressor suction pipe 8 extending therefrom and enters a compressor 9, whereby it is compressed and discharged to the outside of the engine room 2 against the water pressure corresponding to the depth of water via a compressor delivery pipe 10 and a check valve 11. The remaining dewatered exhaust gas is passed as recycle gas through the recycle gas conduits 7 and 12 into an oxygen mixer 13, where it is mixed with oxygen supplied from an oxygen tank 15 under the control of an oxygen flow control valve 14, thereby producing a fresh suction or intake gas. The suction gas thus produced is sucked into the engine 1 through a suction gas pipe 16, suction gas heater 17 and suction gas main pipe 18 and serves to burn a fuel supplied from a fuel tank 19 under the control of a fuel pump 20, thereby providing output power which is then used to drive a load 22 through an output shaft 21 and also drive the excessive gas discharging compressor 9 through a pair of pulleys 23, 24. In addition, stop valves 25 and 26 are adapted to be automatically opened as by a float switch 27, e.g., at the time of the engine room 2 rising to the surface of the water, while at the same time a stop valve 28 interposed between the recycle gas conduit 7 extending from the gas-water separator 6 and the recycle gas conduit 12 extending from the oxygen mixer 13 and a stop valve 30 placed in the oxygen introducing pipe 29 extending from the oxygen tank 15 are closed, in readiness for the atmospheric operation of the engine 1 wherein air is introduced through an atmospheric air suction pipe 31 while the exhaust gas is discharged through an exhaust pipe 32. Further, a stop valve 33 is placed in a fuel introducing pipe 34 extending from the fuel tank 19. Thus, by closing said stop valve 33, the operation of the engine 1 can be stopped.

The outline of the recycle engine apparatus has been described so far. The apparatus can be completed by providing means for controlling recycled gas volume and means for controlling oxygen supply volume. A first object of the present invention is to provide these means.

First, the means for controlling recycled gas volume, i.e., discharged excessive exhaust gas volume will be described. In the recycle engine apparatus, as described above, by discharging an amount of exhaust gas corresponding to the carbon dioxide gas produced as a result of combustion of fuel within the engine 1 from the working gas (exhaust gas-recycle gas-suction gas) system, said working gas pressure can be maintained at a particular value to ensure stable operation. Thus, in the present invention, a little greater amount of exhaust gas than the amount of excessive exhaust gas at the time of the maximum loading of the engine 1 is compressed and a portion of the delivery gas is returned to a working gas pipe (any working gas pipe extending from the exhaust pipe to the suction main pipe will do, but in this case, the upper portion of the gas-water separator 6) through an ordinary secondary pressure control valve 35 and a secondary pressure control valve 37 which works on the basis of the absolute pressure within a thermostatic air tank 36, the working gas pressure at said position being maintained constant in terms of absolute pressure, while the remainder of said delivery gas, i.e., excessive exhaust gas is discharged into the outside of the engine room 2 through the check valve 11. In addition, since the delivery gas pressure from the compressor 9 is required to be higher than the working gas pressure even at small depths of water, the valve-closure pressure of the check valve 11 must be so adjusted. Further, at small depths of water since the delivery gas pressure from the compressor 9 is low, the two-stage pressure control as described above is unnecessary. In that case, the ordinary pressure control valve 35 is unnecessary. The use of such control means makes it unnecessary to use complicated mechanisms such as a rotation control and exhaust gas flow control for the compressor as in the prior art, thus avoiding troubles stemming therefrom the enabling a highly reliable apparatus to be embodied at low cost.

Concerning the control of oxygen supply volume, oxygen is introduced at a constant pressure into said oxygen flow control valve 14 by means of the secondary pressure control valve 38 placed in the oxygen introducing pipe 29 between the oxygen tank 15 and oxygen flow control valve 14, the oxygen supply volume being controlled by said control valve 14. As for the control of this control valve 14, the following system may be contemplated.

Figure 2:
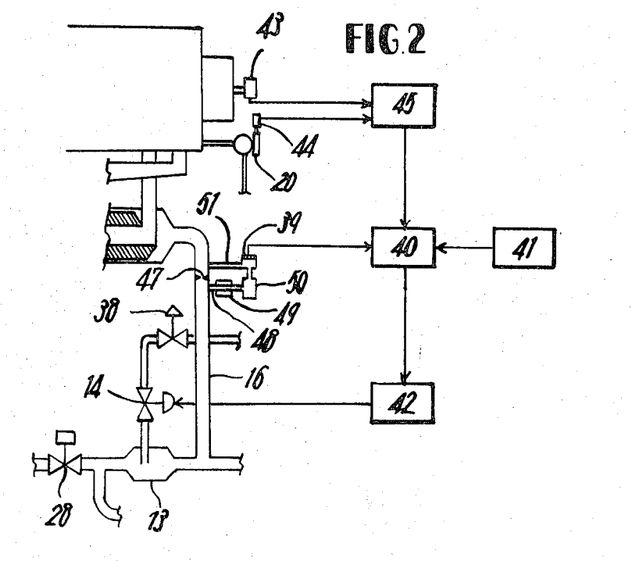
FIG. 2 is an enlarged diagrammatic view of a portion of FIG. 1, and including an oxygen flow control system.

As shown in FIG. 2, the suction oxygen concentration is electrically detected by an oxygen concentration detector 39 installed in the outlet from the mixer 13, i.e. in the suction pipe 16, which detector 39 generates an output signal proportional to the actual oxygen concentration therein. Control means 40 receives from an oxygen concentration presetter 41 a preset signal representative of a desired oxygen concentration value and the output of the control means 40 is fed to a transducer 42 which converts this output into a proportional fluid pressure used to control the setting of the oxygen flow control valve 14. The output of the detector 39 is fed to the control means 40 as a feedback signal which is compared by the control means 40 with the preset signal from the presetter 41 and any difference between these signals is used to adjust the output of the control means. Consequently, the setting of the valve 14 is also adjusted to make the actual oxygen concentration equal to the preset or desired oxygen concentration.

By using the recycle gas control means and the oxygen supply volume control system as described above, the recycle engine apparatus can be completed.

Next, inventions concerning improvements in the present apparatus will be described.

Figure 5:
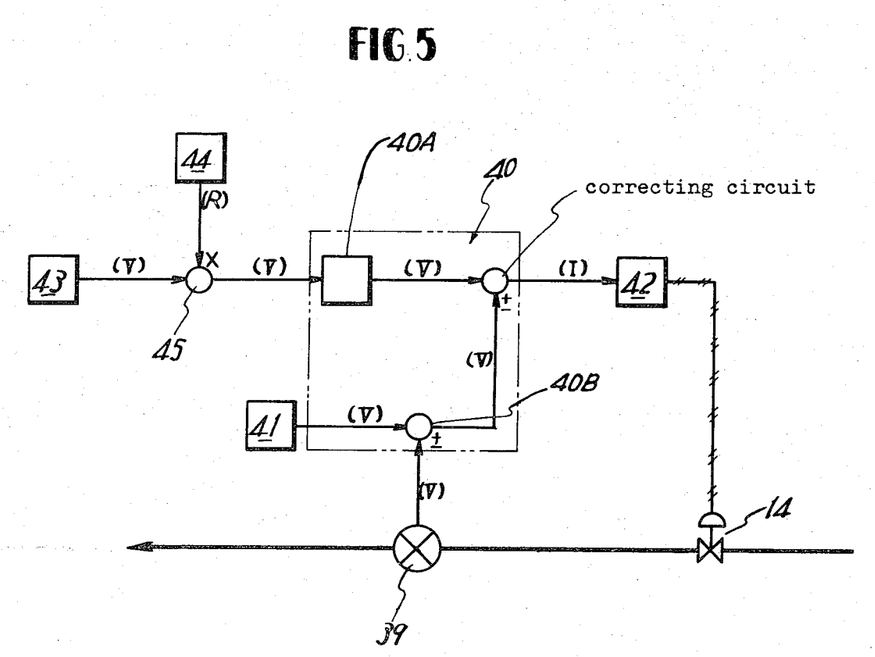
FIG. 5 is a schematic diagram showing components of an oxygen flow control system.

Further improvements in the means for controlling oxygen supply volume will first be descirbed. Although the system described above is simple in construction, there is a problem of detection delay occurring in the oxygen concentration detector 39. That is, generally, the delay in the detection of oxygen concentration is large, as a result of which, in the case of a sudden change in the operation of the engine 1, the control of oxygen supply volume is delayed, so that the actual suction oxygen concentration becomes transiently too high or too low, making it difficult to achieve a safe and stable operation. Therefore, the present invention proposes the following control system. As shown in FIGS. 2 and 5, the engine r.p.m. and the position of the fuel pump rack or setting device are electrically detected by a tachometer generator 43 and by a fuel pump setting position detector 44; and the outputs from these detectors are multiplied by a circuit 45 to obtain a signal proportional to the fuel supply volume, which signal is fed to the control means 40. Alternatively, a signal proportional to fuel supply volume can be obtained directly by attaching a fuel flow meter 46 to the fuel supply line 34, as shown in FIG. 1, and feeding the meter output directly to the control means 40.

The control means 40 in this system modulates the signal proportional to fuel supply volume into a signal suitable for driving the transducer 42, and corrects this signal in accordance with any difference between the actual oxygen concentration indicated by the detector 39 and the preset oxygen concentration established by the presetter 41. As shown in FIG. 5, the control means 40 includes a function generator circuit 40A, a comparing circuit 40B and a correcting circuit 40C. The circuit 40A modulates the signal from the circuit 45 with due consideration for the relation between the flow rate of oxygen for a given position of the control valve 14, and for the operating characteristics of the engine 1 and the transducer 42; the circuit 40B compares the preset signal from the presetter 41 with the signal from the concentration detector 39; and, any difference between these signals is supplied to the circuit 40C which adjust the output of the control means 40 accordingly. For example, if the signal from the detector 39 is greater than the signal from the presetter 41, this means that the actual oxygen concentration is greater than the preset or desired oxygen concentration and the correcting signal from the circuit 40C is accordingly emitted in a direction to decrease the oxygen concentration; and, in the opposite case the correcting signal is also reversed. This correcting signal provides compensation for errors in the operation of the detecting and electrical components of the control system, which errors could build up over a period of operation and cause the suction oxygen concentration to become too high or too low.

Examples of the various control elements described above are as follows:

a. The oxygen concentration detector 39 is a commerically available device, such as Model OA 202 R produced by Biomarine Industries, of Devon, Penn., which generates a voltage directly proportional to the oxygen concentration;

b. The oxygen concentration presetter 41 is a potentiometer or variable resistor arranged to supply a voltage corresponding to that generated by the detector 39 for any given oxygen concentration. The presetter device is manually controlled and is preferably provided with a setting dial calibrated in numerical values indicating desired oxygen concentration;

c. The fuel pump setting detector 44 is a variable resistance or potentiometer which is mechanically operated so that the setting of this device corresponds to the setting of the fuel pump 20; and, d. The transducer 42 is an electro-pneumatic transducer of the current drive type produced by Yokogawa Electric Works, Ltd. of Japan and designed to convert a variable input current into a proportional air pressure which is imparted to a pneumatic type valve positioner to actuate the control valve 14.

A representative circuit for a control system employing the elements described above is shown in FIG. 6 which has been divided into sections numbered 1 through 6 for convenience of reference.

Figure 6:
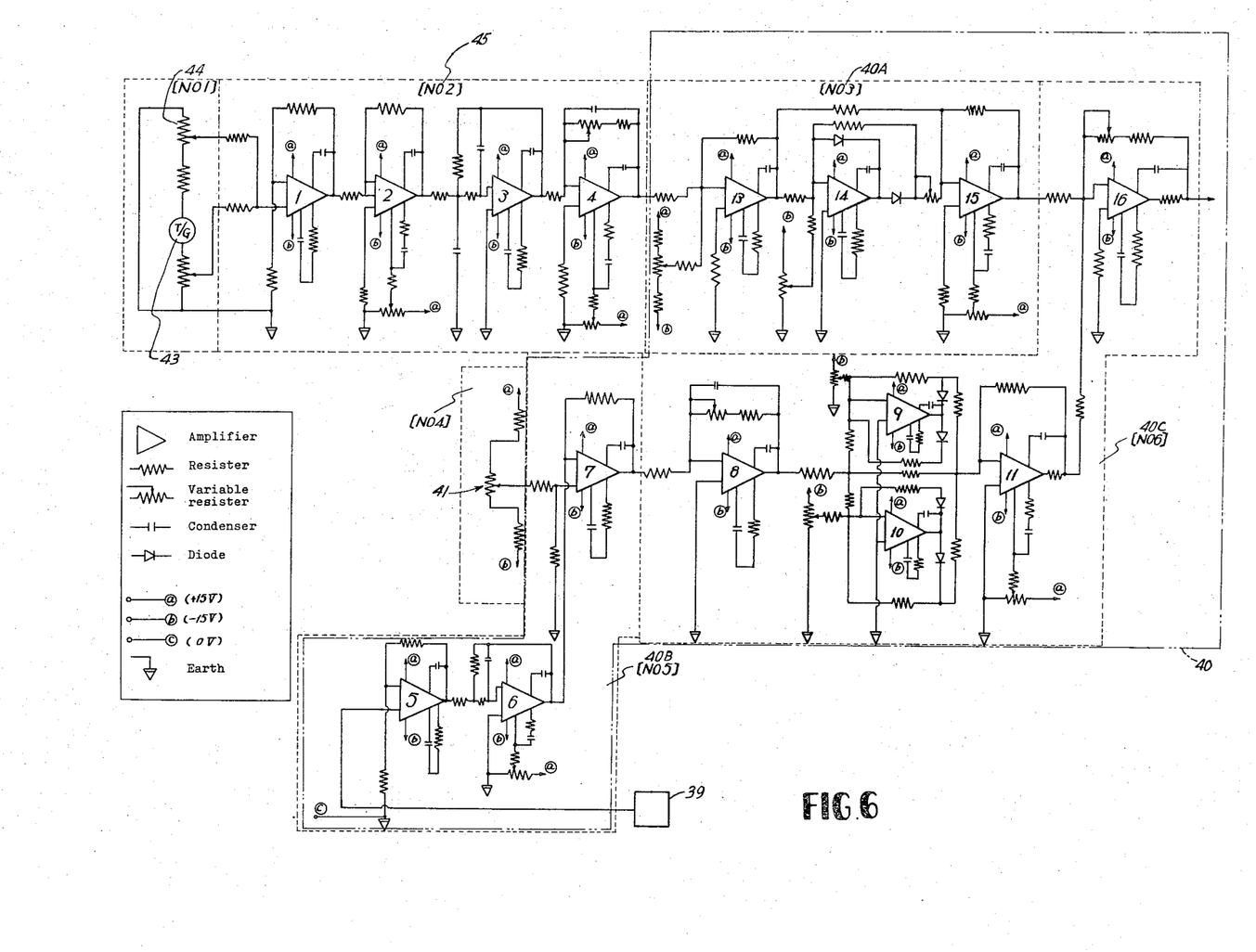
FIG. 6 is circuit diagram for the components of FIG. 5.

Voltages established by the tachometer generator 43 and the fuel pump setting detector 44, shown in section No. 2 of FIG. 6, are fed to the multiplication computer circuit 45 in the No. 2 section. This circuit 45 is constituted by a high input impedence amplifier 1, a phase inverter amplifier 2, a low pass filter 3 and a proportional amplifier 4. The above-mentioned two voltages are multiplied together in the high input impedence amplifier 1, and the phase is inverted in the amplifier 2. Electrical noise is removed by the filter 3 and the proportional amplifier 4 serves for gain control purposes. The voltage which has been gain controlled and which is proportional to the fuel supply volume, is fed to the function generator circuit 40A of the control means 40, shown in the No. 3 section of FIG. 6.

This function generator circuit is used for the purpose of linearizing the non-linearity of the oxygen flow control system. In this case, it is a circuit for generating a step function and is constituted by operational ampliifiers 13, 14 and 15. The amplifier 13 determines that start level of the step function, the amplifier 14 determines the step position and the amplifier 15 determines the gradient of the step. These functions are determined so that the output from the circuit conforms to a curve required by the characteristics of the components, as previously mentioned.

The oxygen concentration presetter 41 is shown in the No. 4 section of FIG. 6 and the voltage established by the desired setting thereof is fed to an amplifier 7 in the comparing circuit 40B shown in section No. 5 of FIG. 6. The voltage generated by the oxygen concentration detector 39 passes through a buffer amplifier 5, which serves as a high input impedence circuit, then through a low pass filter 6, and into the amplifier 7 which compares this voltage with the preset voltage and calculates any difference therebetween. The calculated voltage is used as a correction or feedback voltage which is fed to the correction circuit 40C shown in section No. 6 of FIG. 6.

The correction circuit 40C includes operational amplifiers 8, 9, 10, 11 and 16. The feedback voltage from the comparing circuit is gain controlled by the amplifier 8. Amplifiers 9, 10 and 11 together with silicon diodes constitute a limiter circuit which imposes upper and lower limtis on the feedback voltage thereby providing a damping effect for preventing the application of an excessive correction. The feefback voltage leaving the limiter circuit is added to or subtracted from the output of the function generator circuit 40A and the resulting signal enters the amplifier 16, is gain controlled, and becomes the output supplied by the cortrol means 40 to the transducer 42, as shown in FIG. 5.

Figure 7:
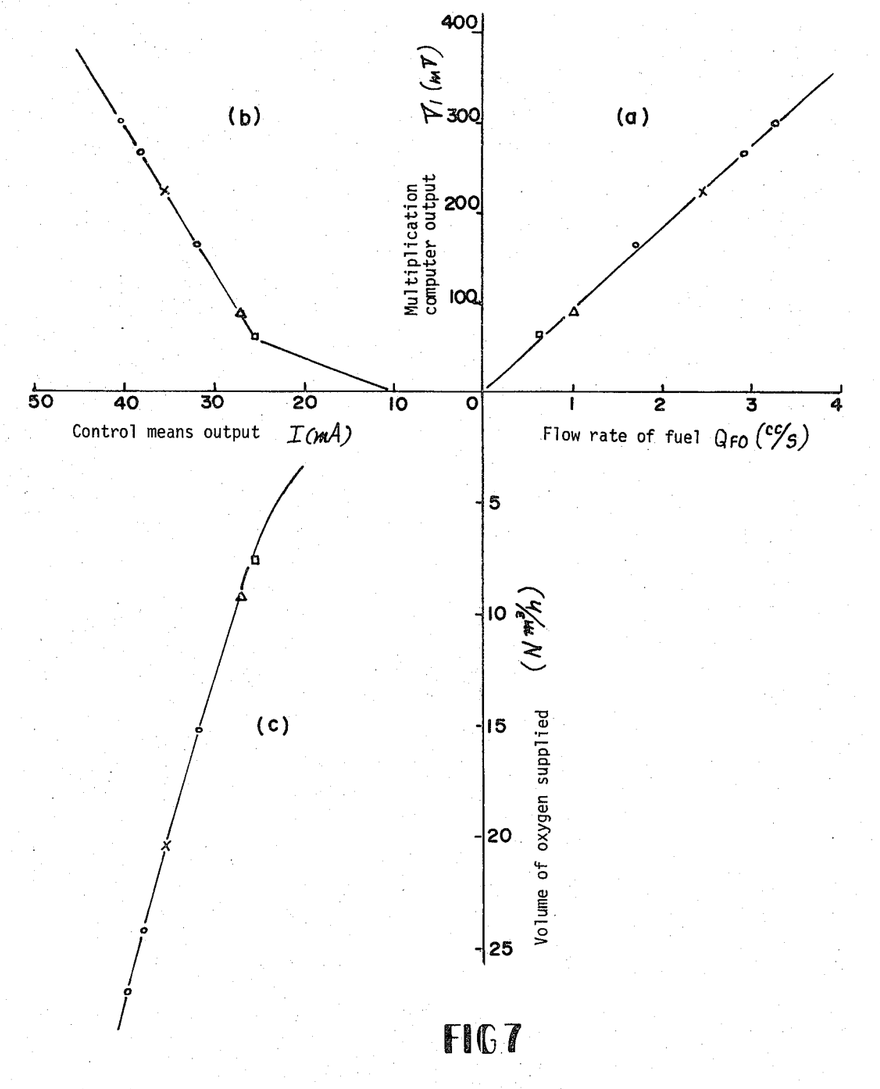
FIG. 7 is a graph illustrating the overall characteristics of the oxygen flow control system.

Overall characteristics of this oxygen supply control system are illustrated by the curves of FIG. 7. Curve (a) shows the direct proportionality between the output voltage V1 of the multiplication computer circuit 45 and the flow rate of fuel Q; curve (b) shows the relation between said output voltage V2 and the output current I from the control means 40, illustrating the previously described step and gradient functions of the circuit 40A; and curve (c) shows the volume of oxygen supplied by the valve 14 when positioned by the transducer 42 in response to the control means output current I.

It will be appreciated by those skilled in the art that the control system described above in detail is subject to variation depending upon the characteristics of the engine being controlled and of the control elements employed. While an example has been described in which the fuel supply volume is electrically detected and electrically treated and the output is converted into a fluid pressure by the transducer 42 to control the oxygen flow control valve, it is also possible to control all operations electrically. Alternatively, some of the operations may be carried out by fluid pressure or mechanical means.

As for the method of installing the suction oxygen concentration detector 39, a sensor for the detector may be inserted in the suction pipe for direct contact with the suction gas, but in that case there is the possibility of errors in detection being created due to the deposition of the water vapor and carbon sludge contained in the suction gas and by the influence of the suction gas temperature. Thus, according to the present invention, as shown in FIG. 2, an orifice 47 is installed in the suction pipe 16 and the suction gas pressure difference created by said orifice is utilized to allow a portion of the suction gas to flow from upstream of the orifice through a thin pipe or channel 48 to the cooler 49 and then to the gas-water separator 50 so that after being cooled and dewatered it is contacted with the sensor of the detector 39, whereupon it is returned to the suction pipe disposed downstream of the orifice through a thin pipe 51. In this way said possibility of error in detection can be excluded.

In said recycle engine apparatus, since the suction gas prepared by the mixer 13 consists mainly of carbon dioxide gas, which is a product of combustion, mixed with saturated water vapor and a minimum volume of oxygen necessary for combustion of fuel, the specific heat ratio is low. Therefore, the compression temperature in the engine main body drops to interfere with the satisfactory ignition and combustion of fuel. As a method of overcoming such problem, there may be contemplated the use of a rise in compression temperature due to the suction gas itself being heated. Thus, in the present invention, as shown in FIG. 1, the suction heater 17 is constituted by an exhaust collection pipe 3 connected to the exhaust branch pipe 52 of the engine 1, a number of fins 53 mounted around the periphery of said collection pipe 3, and a suction reservoir 54 serving as a suction tank arranged to surround said collection pipe 3 and fins 53. Thus, the suction gas passing through the suction reservoir 54 is heated by the exhaust gas from the engine 1 with high efficiency assured by an increased area of contact with the many fins 53, so that its temperature quickly rises, eliminating said problem. Moreover, the radiant heat from the exhaust collection pipe 3 at high temperature is prevented from causing temperature rise in the engine room improving the durability of the parts. In addition, in order to increase this effect, the suction reservoir 54 may surround the exhaust branch pipes 52.

The heat transfer area of the suction heater 17 must be so determined as to provide the specified suction temperature at the time of the maximum loading of the engine 1. Therefore, at the time of low loading, the exhaust temperature will drop and hence the suction temperature will also drop. Therefore, the combustion conditions at the time of low loading are less favorable than at the time of high loading. To overcome this problem, the suction outlet 55 of said suction reservoir 54 is provided with an exhaust bypass valve 56, which will be opened when the suction temperature drops at the time of low loading, to add a portion of the exhaust gas to the suction gas to raise the suction temperature.

As for the control of this exhaust bypass valve 56, the following methods may be contemplated:

A. A method in which the suction temperature in the region of the suction main pipe nearer to the engine 1 than to the exhaust bypass valve 56 is detected to control the degree of opening of the exhaust bypass valve 56 to maintain the suction temperature at a constant value.

B. A method of effecting complete closure at the time of high loading of the engine 1 and full opening at the time of low loading, and opening and closing of the valve at the time of partial loading. In addition, in this case, the setting of partial loading must be determined by considering the allowable maximum suction temperature for full opening of the exhaust bypass valve 56 and the allowable minimum suction temperature for complete closure. In some cases, it is necessary to effect twostep control comprising complete closure, medium opening and full opening. The detection of such loading is effected through the fuel pump fuel supply control rack position or through a product of it and engine r.p.m.

C. A method of controlling the exhaust bypass valve 56 by making use of the fact that the exhaust collection pipe 3 will more or less thermally expand due to the rise of exhaust temperature with increasing load.

The use of the suction heater as described above leads to the absence of bypass exhaust gas in suction gas particularly at the time of high loading without the need to resort to exhaust bypass for the total heat at suction temperature as in the case of the prior art. As a result, it is possible to decrease damage to the engine main body and system parts caused by the circulatory deposition of oxides of sulfur, burnt carbon, etc. due to bypass exhaust gas.

Even if the suction heater 17 as described above is provided, the suction temperature will not sufficiently rise at the time of or immediately after starting the engine 1 since the heat capacity of the suction main pipe, etc. is large. Moreover, since the engine r.p.m. is low, there will be the great trouble of fuel being poorly ignited and burnt due to said low compression, making it greatly difficult to start the engine under recycle condition.

It is also an object of the present invention to improve the startability by blowing compressed air into the working gas pipe to decrease the carbon dioxide gas concentration in the suction gas in order to eliminate said trouble.

As a concrete method therefore, the present invention proposes the following.

This comprises opening a stop valve 57 in a channel for a short time, decreasing the pressure of compressed air from a compression air tank 58 to a suitable value by secondary pressure control valves 59 and 60 and then blowing it into a working gas pipe (which may be any of the working gas pipes extending from the exhaust pipe to the suction main pipe; in this case, it is the recycle gas conduit 12) to decrease the carbon dioxide gas concentration in the working gas. Thereby, the above problem can be solved.

In order to increase this effect, a safety valve 61 may be installed adjacent the inlet of the suction main pipe 18 and, as in the case of the above method, compressed air is blown to discharge the recycle gas through said safety valve thereby replacing the recycle gas in the working gas pipe by air. In this case, the blow port 62 in the channel is spaced as fas as possible from the safety valve (i.e. brought closer to the exhaust pipe 5), or the exhaust by-pass valve 56 is opened so that the recycle gas from the exhaust cooler 4, exhaust pipe 5 and air-water separator 6 may be discharged from the safety valve 61 via said bypass valve 56.

Whereas these methods are effective to start the engine after decreasing the carbon dioxide gas concentration in the working gas pipe or replacing the recycle gas by air, this operation may be carried out during engine start. In this case, since the residual exhaust gas discharging compressor 9 is rotated along with the engine 1, the working gas pressure can be maintained constant due to the decrease of return gas volume and the increase of exhaust gas volume if the volume of air blown is less than the excess compression capacity of the compressor 9 (compression capacity of compressor minus residual exhaust gas volume equals return gas volume from the secondary pressure control valves 35 and 37 and is relatively large in the case of noload run such as at the time of engine start). Further if it is greater than the excess compression capacity, the startability is improved, but the working gas pressure increases until it is discharged into the engine room 2 through the safety valve 61.

The engine 1 can be started by the above methods, but the carbon dioxide gas concentration in the suction gas gradually increases after the stoppage of blowing of compressed air, and the delay in heating by the suction heater 17 results in a low suction temperature, so that stable combustion cannot be attained and in extreme cases the engine stops. Thus, the above drawback is eliminated by opening the stop valve 63 after start until the suction temperature rises sufficiently to assure stable combustion and blowing a small volume (within the range of the excess compression capacity of the compressor 9) of compressed air into the working gas pipe through an orifice-equipped pipe 64 to decrease the carbon dioxide gas concentration in the suction gas. In this way, the above drawback can be solved.

In addition, each of the above operations is carried out in recycle condition, i.e., with the stop valve 28 opened, and oxygen is supplied in a controlled manner by the flow control valve 14.

Methods in which compressed air is blown in order to facilitate engine start in recycle condition have been described so far. Besides them, the present invention also proposes a method of improving the startability in which at the time of engine start, compressed nitrogen, helium, argon or other high specific-heat-ratio inert gas is blown into the working gas pipe to decrease the carbon dioxide gas concentration in the working gas, thereby eliminating the troubles about engine start. Such method will now be described.

The engine 1 is started by closing the stop valve 28 disposed between the gas-water separator 6 and the mixer 13 to interrupt communication between the recycle gas conduits 7 and 8, decreasing the pressure of high specific-heat-ratio inert gas from the tank 58 by means of the secondary pressure control valves 59 and 60 to a suitable pressure, blowing said gas between said mixer 13 and stop valve 28 through the stop valve 57, mixing said blown gas with oxygen introduced at a constant pressure from the oxygen tank 15 into the oxygen flow control valve 14 through the stop valve 30 and secondary pressure control valve 38, controlled by said control valve 14 and fed into the mixer 13, and feeding said mixed gas into the suction pipe 16. The exhaust gas discharged from the engine heats the suction gas in the suction gas heater 17 and is then cooled in the exhaust cooler 4. It is then de-watered by the gas-water separator 6, introduced into the compressor 9 through the compressor suction pipe 8 and thereby compressed, and finally discharged into the outside of the engine room 2 through the check valve 11 against the pressure outside the engine room 2. However, since the compression capacity of the compressor 9 is much less than the volume of exhaust gas discharged from the engine 1, some of the exhaust gas which is not discharged by the compressor 9 is admitted into the engine room 2 through the safety valve 65 attached to the compressor suction pipe 8.

The engine 1 may also be started by opening the stop valve 28, i.e., positioning it in recycle condition, feeding oxygen in a controlled manner, and blowing high specific-heat-ratio inert gas into the working gas pipe to decrease the carbon dioxide gas concentration in the suction gas. In this case, if the volume of the high specific-heat-ratio inert gas is less than the excess compression capacity of the compressor 9 [(compression capacity of said compressor)− (excess exhaust gas volume)=(volume of gas returned from secondary pressure control valves 35 and 37), it being considerably large during no-lead run such as at engine start], then the working gas pressure can be maintained at the pressure value preset by the secondary pressure control valve 37 due to an increase in the returned gas volume and an increase in the exhaust gas volume, but if it exceeds said excess compression capacity, the startability is improved by a decrease in the carbon dioxide gas concentraton and an increase in the high specific-heat-ratio gas concentration but the working gas pressure increases until it is discharged into the engine room 2 through the safety valve 65.

The engine main body can be started by the method described above, but as in the case of compressed air blow, after the stoppage of blowing of high specific-heat-ratio inert gas the carbon dioxide gas concentration in the suction gas gradually increases and since the suction gas temperature is low due to the delay in heating by the suction gas heater 17, no stable combustion is attained and in extreme cases the engine stops. Thus, it is recommended to open the stop valve 63 after start until the suction gas temperature is increased sufficiently for stable combustion, in order to blow a small volume (within the range of the excess compression capacity of the compressor 9) of gas through the orifice-equipped pipe 64 to decrease the carbon dioxide gas concentration in the suction gas.

The gas discharged into the engine room 2 through the safety valve 61 or 65 increases the pressure in the engine room 2, but when the engine reaches its normal operating condition and the working gas pressure is adjusted to the pressure value preset by the secondary pressure control valve 37, the gas will be returned to the working gas pipe through the ambient gas check valve 66 if the pressure in the engine room 2 is higher than said preset pressure. Thus, the pressure in the engine room 2 is adjusted to a pressure somewhat higher than said preset pressure. Further, the check valve 67 is connected to the crank chamber 68 of the engine 1 (and/or the crank chamber of the compressor 9) and serves to return the leakage gas from the piston rings to the working gas. As shown, the conduit of said leakage check valve 78 may be installed downstream of the position where the conduit of the check valve 66 is inserted from within said engine room 2, as in the case of the inlet of the suction main pipe 18, or even if it is inserted in the same position, it is advantageous to set the valve-opening presssure of the check valve 67 at a value smaller than that of the check valve 66, since the pressure in the crank chamber is thereby made lower than the pressure in the engine room 2 so that the lubricating oil mist in the crank chamber is prevented from being scattered into the engine room 2. In addition, when this return system is used, the setting of the valve-opening pressure of the check valve 66 at a proper value makes is possible without fail to have a working gas pressure lower than the pressure in the engine room 2, so that there is no danger of the working gas leaking into the engine room 2. This is advantageous from the standpoint of safety. In addition, the purpose of the provision of the pressure reducing valve 69 is to feed a fuel-substitute pressurizing gas to the fuel tank 19.

In addition, the engine room 2 will become a completely sealed container if an engine start system is employed in which, under recycle condition with the stop valve 28 opened regardless of whether compressed air blow engine start or high specific-heat-ratio inert gas blow engine start is used, oxygen is supplied in the controlled manner and the safety valve 61 or 65 is not installed and the carbon dioxide gas concentration in the suction gas is decreased and if said check valve 67 is installed in a conduit which establishes communication between the crank chamber 68 of the engine 1 (and/or the crank chamber of the compressor 9) and the working gas pipe and the gas leaking from the cylinder of the engine 1 (and the cylinder of the compressor 9) to the crank chamber is recovered and fed into the working gas. Thus, if inert gas such as nitrogen gas is hermetically sealed within the engine room 2, this is extremely advantageous from the standpoint of safety since even if the fuel feed system is damaged causing the fuel to scatter into the engine room 2, explosion can be prevented.

Means for cooling and de-watering exhaust gas, which is a further feature of the present invention, will now be described.

As a basic cooling water feed system the present invention employs the following:

The exhaust gas discharged from the engine 1 is cooled substantially to ordinary temperature in the exhaust cooler 4 by low temperature cooling water being sprayed from a sprayer 70 to condense the combustion-produced vapor, and the condensation water and cooling water are separated by the gas-water separator 6 and allowed to fall down into a de-watering tank 71, while the de-watered gas is introduced into the mixer 13 as a recycle gas and the excessive gas is introduced into the compressor 9. A method will first be described in which sea water is directly used as the cooling water.

In the case of using the present apparatus as a power source for an under-sea water diving apparatus, outside the engine room 2 there is an abundance of low temperature sea-water (or low temperature fresh water in the case of a lake) at a pressure corresponding to the depth of water. This low temperature sea-water is introduced through a stop valve 75 by a sea-water suction pump 74 driven through a pulley 72 fixed to the engine output shaft 21 and a mating pulley 73. In the case of using a ready-made pump as said sea-water suction pump 74 at a depth of water greater than the suction pressure corresponding to the allowable pressure, it goes without saying that sea-water must be introduced after being decreased in pressure by a pressure control valve 76. In addition, when a special anti-pressure pump is used and the delivery sea-water pressure of said sea-water pump 74 becomes greater than is necessary, a pressure control valve 77 is installed on the delivery side of said pump 74 whereby sea-water is adjusted to a suitable pressure before it is introduced into the sprayer 70. In the process of being introduced into the sprayer 70 to cool the exhaust gas, said pressurized sea-water is also introduced into an engine room atmosphere cooling radiator 78 to cool the atmosphere of the engine room. It is also introduced into the engine 1 to cool an engine cooling pure water cooler and a lubricating oil cooler. Further, it also cools the compressor 9 and thermostatic air tank 36. On the other hand, the combustion-produced water and cooling sea-water separated by the gas-water separator 6, along with said sea-water after being used to cool said various parts, are stored in a water storage tank 71, said stored water being pressurized by a sea-water discharge pump 80 driven by the engine output shaft 21 through the pulleys 72 and 79 and being then discharged outside of the engine room 2 through a check valve 81 against the pressure outside engine room 2 corresponding to the depth of water, but said water storage tank 71 has a free water level in the upper head of the tank through a vent pipe 82 between the tank and the gas-water separator 6 and feeds back the delivered sea-water from the delivery side of said discharge pump 80 through a bypass pipe 83 and a float valve 84 to maintain said water level. In addition, it is necessary that the capacity of the sea-water discharge pump 80 be somewhat greater than the sum of the capacity of the sea-water suction pump 74 and the volume of combustion-produced water in order to secure the volume of fed-back water.

While the above sea-water suction system has been described in connection with the use of said diving apparatus at a depth of water which changes in a wide range, simplification may be made when it is used in a constant depth of water. That is, when it is used at a small depth of water, the pressure control valve 77, as well as the pressure control valve 76, becomes unnecessary by setting the delivery pressure of the sea-water suction pump 74 at a pressure value preset for the cooling system. Further, when it is used at a large depth of water, the sea-water suction pump 74 may be replaced by a water turbine adapted to be driven by an energy of pressure head between the water depth-equivalent pressure and the pressure preset for the cooling system. (Of course, the pressure control valves 76 and 77 are unnecessary). Further simplification may be made by eliminating said water turbine and pressure control valve 77 and installing the pressure control valve 76 alone so that sea-water is decreased in pressure by said pressure control valve 76 to the value preset for the cooling system and then distributed to the various parts of the cooling system. In addition, in the case of the depth of water corresponding to the pressure preset for the cooling system, it goes without saying that none of said pressure valves 76 and 77 are necessary and that neither the water suction pump 74 nor the water turbine is necessary.

As has been described so far with reference to the embodiments, according to the present invention, since water from outside the engine room 2 is directly introduced to cool the exhaust gas and various parts within the engine room 2, unlike a cooling system incorporating the circulation of pure water to be later described, it is possible to prevent the sulfuric acid and carbon contained in the exhaust gas from polluting the cooling water and from causing damage to the engine and various parts and it becomes unnecessary to install a cooler for circulating pure water. The cost is low and the cooling water can be maintained at lower temperatures, improving the cooling efficiency. Further, since the water pressure to be introduced into the various parts of the cooling system can be adjusted, ready-made parts for the cooling system can be used as such instead of using specially designed ones, so that the cooling system can be constructed at low cost. Further, although the water after being used to cool the various parts is stored in a water storage tank and is then discharged therefrom, the water level in said water storage tank is maintained constant, which provides a pollutant filtrating effect and thus prevents the pollution of the sea.

A method incorporating the circulation of pure water used as cooling water will now be described.

Figure 3:
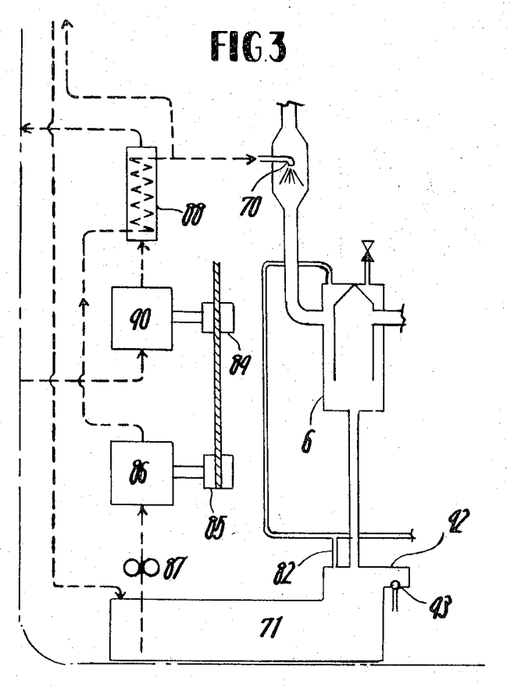
FIGS. 3 and 4 are diagrammatic views each showing a different cooling system.
Figure 4:
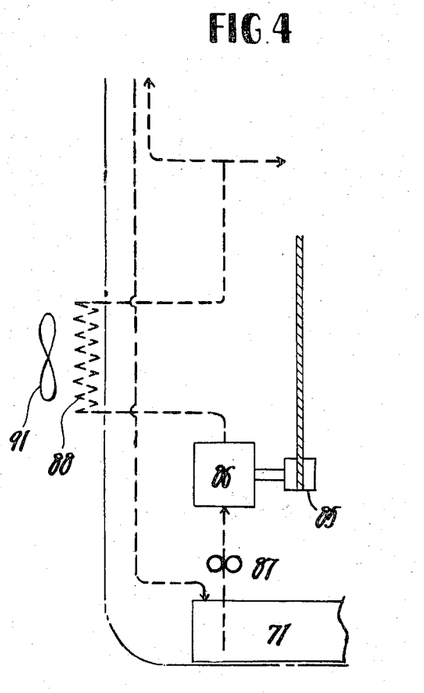

In the case of using the present apparatus as a power source for an under-sea-water diving apparatus as shown in FIG. 3, pure water stored in a water storage tank 71 is pumped into a pure water cooler 88 through a filter 87 by a pure water pump 86 driven by a pulley 72 fixed to the engine output shaft 21 and a mating pulley 85. After the pure water is cooled in said cooler 88 by sea-water introduced thereinto by a sea-water pump 90 driven through the pulley 72 and mating pulley 89, it is fed into a sprayer 70 for exhaust gas cooling purposes. Further, a portion of said pure water is fed into various parts to cool the engine 1, compressor 9, etc. In addition, the pure water (cooler) cooling sea-water is discharged directly from the cooler 88 outside of the engine room 2. Therefore, the sea-water pump 90 and cooler 88 must be of anti-pressure construction to withstand the water pressure corresponding to the allowable depth of water for the present apparatus. While the cooler 88 has been shown as installed in the delivery conduit of the pure water pump 86, it may be installed in the water storage tank 71. Alternatively, as shown in FIG. 4, it may be installed outside the engine room 2 so as to be subjected to cooling by the natural convection of sea-water. In this case, the sea-water pump 90 becomes unnecessary, so that the cost is low. Further, in the case of driving the present apparatus on the water or on land, the form shown in FIG. 4 is employed and the cooler 88 is used as a radiator adapted to be cooled by cool air supplied as by a separately driven fan 91. On the other hand, said low temperature pure water sprayed from the sprayer 70 cools the exhaust gas approximately to ordinary temperature and, while condensing the combustion-produced water vapor contained therein, is passed through the exhaust pipe 5 into the gas-water separator 6, where along with the condensation water is is separated and allowed to fall down into the water storage tank 71.

In the present apparatus, since pure water is circulated in a closed cooling water circuit, as described above, the combustion-produced moisture content alone becomes superfluous, the discharge thereof being carried out as follows.

As shown in FIG. 3, the upper portion of the water storage tank 71 is provided with a head 92 to ensure that even when the engine room 2 is tilted the water surface fluctuates little. A vent pipe 82 leading to the top of the gas-water separator 6 is connected to said head, and there is provided a drain trap 93 through which excessive water is discharged into the engine room 2. Along with water and oil leaking from various parts, the excessive water which collects on the bottom of the engine room 2 is discharged outside of the engine room 2 against the pressure outside the engine room 2 through a check valve 95 by a bilge pump 94 (see FIG. 1) either driven or water-surface-controlled at particular intervals of time. While a drain trap is used in this embodiment, such drain trap may be omitted and instead the suction pipe of the bilge pump 94 may be introduced directly into the water storage tank 71 to carry out the control of the bilge pump in the manner described above.

As described in the above embodiment according to the present invention, pure water is cooled and circulated through various parts to cool the latter, but the pollution of pure water by the sulfuric acid and carbon contained in the exhaust gas is diluted with the combustion-produced water. Moreover, damage to the engine and other parts by the salt contained in sea-water in the conventional system using sea-water can be avoided. A further merit is that the present cooling system can be used in muddy water and in air.

We claim:

1. Apparatus for operating an engine having a gas intake, an exhaust gas outlet and a working gas recycling system connected between said intake and said outlet, said apparatus comprising:

means for controlling the volume of exhaust gas recycled to the engine intake in said recycling system including a compressor having an inlet connected to said recycling system and an outlet, the compressor being capable of compressing exhaust gas at a rate in excess of the full load exhaust volume less the full load intake volume of the engine, a return connection from the compressor outlet to the recycling system, and means including a control valve in the return connection for returning a portion of the compressed exhaust gas to the recycling system to maintain the working gas pressure at a constant value and for discharging the remainder of the compressed exhaust gas from the apparatus;

oxygen supply means communicating with the recycling system and including an oxygen supply flow control valve, an oxygen concentation detector, an oxygen concentration presetter, and, an oxygen volume control means for producing an output signal to regulate the oxygen supply flow control valve in response to output signals from the oxygen concentration detector and presetter.

2. Apparatus as set forth in claim 1 further including means for supplying fuel to the engine, and fuel supply volume detecting means having an output connected to the oxygen volume control means, said oxygen volume control means being capable of regulating the flow of oxygen to the recycling system in accordance with the theoretical oxygen volume necessary for complete combustion of the fuel supplied as indicated by the output of the fuel supply volume detecting means, the output of the control means being corrected in accordance with the difference between the preset oxygen concentration indicated by the output of the presetter and the detected oxygen concentration indicated by the output of the concentration detector.

3. Apparatus as set forth in claim 2 wherein the fuel supply means includes a fuel pump having a volume setting device, said fuel supply volume detecting means including an engine rpm detector and a fuel pump setting detector and means for combining the outputs of the rpm detector and the fuel pump setting detector to obtain a fuel supply volume output.

4. Apparatus as set forth in claim 2, wherein said fuel supply volume detecting means comprises a flow meter communicating with the engine fuel supply means.

5. Apparatus as set forth in claim 1, wherein said oxygen concentration detector comprises an orifice in the recycling system, a bypass channel communicating from upstream to downstream around said orifice, and an oxygen sensor located in said bypass channel.

6. Apparatus as set forth in claim 5, including a cooler and a gas-water separator disposed in said bypass channel upstream of said sensor.

7. Apparatus as set forth in claim 1, wherein the recycling system includes heat exchanger means adapted to reclaim heat from the engine exhaust gas for heating the engine intake gas, said heat exchanger means including a reservoir serving as surge control means for said intake gas.

8. Apparatus as set forth in claim 7, wherein the recycling system includes an exhaust bypass valve communicating between the engine exhaust outlet and intake, said exhaust bypass valve being adapted to mix exhaust gas directly with intake gas during low load engine operation.

9. Apparatus as set forth in claim 1, including means for blowing compressed gas into said recycling system at the time of engine start.

10. Apparatus as set forth in claim 9 wherein said means for blowing compressed gas comprises a tank for compressed gas, a channel communicating between said tank and the recycling system, a stop valve in said channel, a pipe line communicating between said recycling system and said channel at a location between said stop valve and said tank, and an orifice and second stop valve located in said pipe line.

11. Apparatus as set forth in claim 9, including a safety valve adapted to allow purging of the gas in said recycling system upon blowing of compressed gas, said safety valve being located between the engine intake and said compressed gas channel.

12. Apparatus as set forth in claim 9, wherein said recycling system includes an oxygen mixer, a gas stop valve located upstream of said oxygen mixer, a second safety valve located upstream of said gas stop valve, and a blow port for said compressed gas located between said gas stop valve and said oxygen mixer.

13. Apparatus as set forth in claim 1, including conduit means connected to said recycling system and adapted to return leakage gas from said engine thereto, a check valve in said conduit, and a second check valve connected to said recycling system, at a position upstream of said leakage conduit connection with said recycling system and adapted to draw ambient gas into said recycling system.

14. Apparatus as set forth in claim 13, wherein the opening pressure of the ambient gas check valve is higher than the opening pressure of the conduit check valve.

15. Apparatus as set forth in claim 1 wherein the engine and the recycling system are located in an engine room, and including a cooling water feed system, a pump for introducing water from outside the engine room to said cooling water feed system, a water storage tank connected to said cooling water feed system for storing the water after being used for cooling, a drain pump for draining the water in said water storage tank outside the engine room, a bypass pipe establishing communication between the delivery side of said drain pump and said water storage tank, and a valve for opening and closing said bypass pipe in accordance with changes in the water level in said water storage tank.

16. Apparatus as set forth in claim 1 wherein the engine and the recycling system are located in an engine room, and including a cooling water feed system for introducing water from outside the engine room to various parts to be cooled, a pressure control valve for adjusting the pressure of the introduced water to a cooling water preset pressure, a water storage tank for storing the water after being used to cool the various parts, a drain pump for draining the water in said water storage tank outside the engine room, and a check valve installed in the delivery side of said drain pump.

17. Apparatus as set forth in claim 1 including a cooling water circuit, spray means in the cooling water circuit for injecting cooling water directly into the recycling system, a gas water separator disposed in the cooling water circuit downstream of said spray means and adapted to separate cooling water and combustion produced water from the exhaust gas, a water storage tank in said cooling circuit adapted to receive said separated water, cooling means for said cooling circuit, and a drain trap connected to said water storage tank and adapted to discharge excess water from the cooling water circuit.

* * * * *

UNITED STATES PATENT OFFICE
CERTIFICATE OF CORRECTION

PATENT NO. : 3,871,343
DATED : March 18, 1975
INVENTOR(S) : Masashi Nagai; Kazuhito Miwa; Masakazu Tsunetsugu; and Tadamaro Fujiwara It is certified that error appears in the above-identified patent and that said Letters Patent are hereby corrected as shown below:

Column 3, line 43, delete the word "the";

Column 6, line 8, change "limtis" to read --limits--;

Column 6, line 10, change "feefback" to read --feedback--;

Column 9, line 61, change "lead" to read --load--;

Column 10, line 13, before the word "start" insert --engine--;

Column 10, line 48, change "is" to read --it--;

Column 12, line 31, after the word "pressure" insert --control--;

Column 13, line 27, change "is" (first occurrence) to read --it--;

Signed and sealed this 24th day of June 1975.

(SEAL)
Attest:

RUTH C. MASON
Attesting Officer

C. MARSHALL DANN
Commissioner of Patents
and Trademarks